United States Patent
Li et al.

(10) Patent No.: US 12,368,542 B2
(45) Date of Patent: Jul. 22, 2025

(54) SYSTEM AND METHOD TO ASSURE DATA QUALITY IN DISTRIBUTED DATA COLLECTION PIPELINE

(71) Applicant: Alibaba Group Holding Limited, Grand Cayman (KY)

(72) Inventors: Shuangjiang Li, Fremont, CA (US); Shi Zhao, Fremont, CA (US); Miao Wang, Sunnyvale, CA (US); Hui Liu, Sunnyvale, CA (US); Jiayao Hu, Milpitas, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 1272 days.

(21) Appl. No.: 16/355,420

(22) Filed: Mar. 15, 2019

(65) Prior Publication Data
US 2020/0295888 A1 Sep. 17, 2020

(51) Int. Cl.
*H04L 1/22* (2006.01)
*G06F 9/38* (2018.01)
*H04L 1/20* (2006.01)

(52) U.S. Cl.
CPC .............. *H04L 1/20* (2013.01); *G06F 9/3867* (2013.01)

(58) Field of Classification Search
USPC ......................................................... 370/252
See application file for complete search history.

(56) References Cited

U.S. PATENT DOCUMENTS

| | | | |
|---|---|---|---|
| 10,033,602 B1* | 7/2018 | Russell | H04L 43/06 |
| 10,102,110 B1* | 10/2018 | Kimball | G06F 11/3672 |
| 10,146,954 B1* | 12/2018 | Brisebois | G06F 16/258 |
| 10,547,576 B1* | 1/2020 | Kaushal | H04L 69/329 |
| 2002/0036986 A1* | 3/2002 | Haarsten | H04L 1/18 709/225 |
| 2002/0065864 A1 | 5/2002 | Hartsell et al. | |
| 2002/0120741 A1 | 8/2002 | Webb et al. | |
| 2002/0152305 A1 | 10/2002 | Jackson et al. | |
| 2002/0194251 A1 | 12/2002 | Richter et al. | |
| 2005/0080856 A1* | 4/2005 | Kirsch | H04L 63/145 709/224 |
| 2005/0091319 A1* | 4/2005 | Kirsch | H04L 51/212 709/206 |
| 2005/0193269 A1 | 9/2005 | Haswell et al. | |
| 2005/0198159 A1* | 9/2005 | Kirsch | H04L 51/212 709/206 |
| 2006/0059253 A1 | 3/2006 | Goodman et al. | |
| 2006/0109786 A1* | 5/2006 | Abdel-Kader | H04L 65/80 370/232 |
| 2006/0190243 A1 | 8/2006 | Barkai et al. | |
| 2009/0104963 A1 | 4/2009 | Burman et al. | |
| 2011/0153351 A1 | 6/2011 | Vesper et al. | |
| 2011/0261687 A1 | 10/2011 | Armstrong et al. | |
| 2011/0261795 A1 | 10/2011 | Honegger et al. | |
| 2013/0116038 A1 | 5/2013 | Alderucci et al. | |
| 2014/0206433 A1 | 7/2014 | Lutnick et al. | |
| 2015/0083044 A1 | 3/2015 | Nielsen et al. | |

(Continued)

*Primary Examiner* — Gregory B Sefcheck
*Assistant Examiner* — Majid Esmaeilian

(57) ABSTRACT

The integrity of an end-to-end message sent from a source to a destination in a distributed data pipeline is improved by tracking the number of messages sent to and received by each of the intermediate components and sink components of the pipeline as the messages move through the distributed data pipeline.

20 Claims, 6 Drawing Sheets

(56) References Cited

U.S. PATENT DOCUMENTS

| | | |
|---|---|---|
| 2015/0238857 A1 | 8/2015 | Amaitis et al. |
| 2015/0295842 A1* | 10/2015 | Han ................ H04L 47/621 370/235 |
| 2016/0012010 A1 | 1/2016 | Ganapathy et al. |
| 2016/0182425 A1* | 6/2016 | Asghar ............. H04L 51/56 709/206 |
| 2016/0182486 A1 | 6/2016 | Wu et al. |
| 2016/0246653 A1 | 8/2016 | Ebcioglu et al. |
| 2016/0277417 A1* | 9/2016 | Li ...................... H04L 51/48 |
| 2016/0323237 A1 | 11/2016 | Warfield et al. |
| 2016/0359574 A1 | 12/2016 | Lee et al. |
| 2016/0359872 A1 | 12/2016 | Yadav et al. |
| 2017/0019315 A1 | 1/2017 | Tapia et al. |
| 2017/0053479 A1 | 2/2017 | Manning et al. |
| 2017/0069162 A1 | 3/2017 | Williams et al. |
| 2017/0149518 A1 | 5/2017 | Hartlmueller et al. |
| 2017/0249806 A1 | 8/2017 | Lutnick et al. |
| 2017/0288727 A1 | 10/2017 | Rappaport |
| 2017/0353991 A1 | 12/2017 | Tapia |
| 2018/0025157 A1 | 1/2018 | Titonis et al. |
| 2018/0218034 A1 | 8/2018 | Sainaney |
| 2020/0099667 A1* | 3/2020 | Parthasarathy ..... G06F 21/6218 |

\* cited by examiner

SYSTEM AND METHOD TO ASSURE DATA QUALITY IN DISTRIBUTED DATA COLLECTION PIPELINE

BACKGROUND OF THE INVENTION

1. Field of the Invention

The present application relates to the field of distributed data pipelines and, in particular, to a distributed data pipeline that verifies the messages at one or more stages in the pipeline.

2. Description of the Related Art

A data pipeline is a network of components that can include, for example, data collection agents, a message queue, a computation engine, and storage resources. One issue with data pipelines is end-to-end message integrity. When a message is generated by a source and passed through different components in the network, the data can be transformed or lost.

Current-generation data pipelines focus on single message integrity (e.g., an integrity check with checksum), and do not consider message transformations and losses that can occur when passing through data pipelines. It is common for one message to be transformed into multiple messages, and for multiple messages to be merged into one message when passing a network component.

For example, the original message generated by a remote direct memory access (RDMA) agent (a type of data collection agent) contains multiple fields which are commonly transformed by an upstream proxy into three messages based on the application logic. It is also highly possible that some messages will not be received at the next receiving end (e.g., a message is not sent after the maximum number of retries by the sender, the message is lost by the sender, or the message is dropped by the receiver due to software bugs).

As a result, the destination has no conclusion on whether all messages from the source have been successfully received (although the destination can determine that the messages that have been received have not been corrupted). Moreover, message-level data quality is different from the packet-level data quality. It is common for packets to be successfully transmitted to a receiver that cannot construct the messages due to resource limitations (e.g., CPU limit and Memory limit).

Thus, since it is not unusual for the message transformation process to fail due to various reasons (e.g., a received message is corrupted, a receiver suffers CPU or memory shortage, and a conversion software version mismatch), and since data transformations and losses can occur in any component of the data pipeline, there is a need to assure data quality on the destination side.

SUMMARY

The present disclosure provides a distributed data pipeline that assures end-to-end data quality by verifying the messages at one or more stages in the pipeline. A component of a distributed data pipeline includes a memory and a processor coupled to the memory. The processor to read information from and write information to the memory to determine a number of messages that should have been received, determine a number of messages that were actually received, and determine whether the number of messages that were actually received match the number of messages that should have been received. The number of messages that should have been received is generated by an upstream component using a predefined transformation function. The processor to also generate a lost message signal when the number of messages that were actually received does not match the number of messages that should have been received.

The present disclosure also provides a method of operating a component of a distributed data pipeline that includes determining a number of messages that should have been received, determining a number of messages that were actually received, and determining whether the number of messages that were actually received combined with an error tolerance number is less than the number of messages that should have been received. The method also includes generating a lost message signal when the number of messages that were actually received combined with the error tolerance number is less than the number of messages that should have been received.

The present disclosure further provides a non-transitory computer-readable storage medium having embedded therein program instructions, which when executed by a processor causes the processor to execute a method of operating a component in a distributed data pipeline. The method includes determining a number of messages that should have been received, determining a number of messages that were actually received, and determining whether the number of messages that were actually received combined with an error tolerance number is less than the number of messages that should have been received. The method also includes generating a lost message signal when the number of messages that were actually received combined with the error tolerance number is less than the number of messages that should have been received.

The present disclosure additionally includes a distributed data pipeline that includes a source component to generate a number of messages, transmit the number of messages, determine a number of messages that were transmitted, and transmit a notification that indicates the number of messages that should have been received from the number of messages that were transmitted. The distributed data pipeline also includes a first-level component coupled to the source component. The first level component to receive the number of messages, determine a number of messages that should have been received from the notification, and determine a number of messages that were actually received. The first level component to also determine whether the number of messages that were actually received combined with an error tolerance number is less than the number of messages that should have been received. The first level component to further generate a lost message signal when the number of messages that were actually received combined with the error tolerance number is less than the number of messages that should have been received.

A better understanding of the features and advantages of the present disclosure will be obtained by reference to the following detailed description and accompanying drawings which set forth an illustrative embodiment in which the principals of the invention are utilized.

A better understanding of the features and advantages of the present invention will be obtained by reference to the following detailed description and accompanying drawings which set forth an illustrative embodiment in which the principals of the invention are utilized.

DETAILED DESCRIPTION OF THE INVENTION

Figure 1:
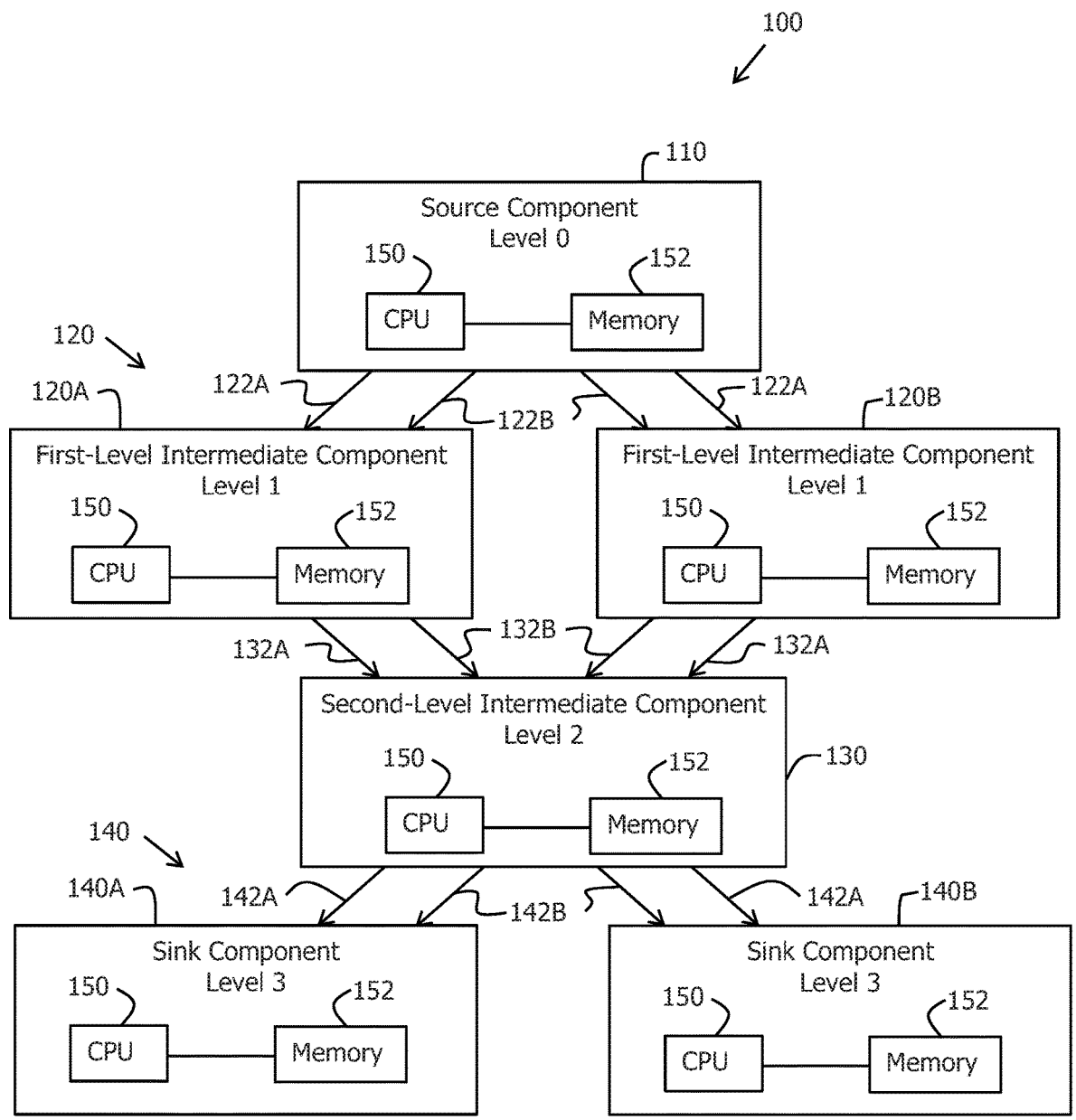
FIG. 1 is a diagram illustrating an example of a distributed data pipeline 100 in accordance with the present invention.

FIG. 1 shows a diagram that illustrates an example of a distributed data pipeline 100 in accordance with the present disclosure. As described in greater detail below, the present disclosure guarantees that messages generated at a source are reliably received at a destination by tracking the number of messages sent to and received by each of the components of the pipeline as the messages move through the distributed data pipeline.

The following terminologies are defined to aid in the understanding of the present invention.

Distributed Data Pipeline: A distributed system that collects data from the source and sends original or transformed data to the destination. It consists of multiple networked components.

Message: A message is data with a header. A packet, in turn, is a portion of the data with a header. In message switching, a router must wait for all of the data to be received before forwarding the data, whereas in packet switching a router can forward data as soon as each portion of the data has been received.

Data Quality: The amount of data received on the destination compared with the data sent from the source.

Source: The beginning component of a data pipeline which generates messages. There could be multiple sources in a data pipeline.

Sink: The ending component of a data pipeline which consumes data generated from the source. There could be multiple sinks in a data pipeline.

Batching Mode: Messages are not sent immediately from a component after being generated or received. Instead, messages are sent after accumulating to a certain number of messages or after a fixed period of time.

Streaming Mode: A message is sent immediately from a component after being generated or received.

Transformation Functions f(*) and g(*): Functions that takes a scalar or vector of integer numbers, mapping the number of received messages to the number of messages to be sent.

Epsilon(*): A predefined integer that determines whether there is a loss event. For practical sake, it is a value ranging from 0 to a specific fraction of the number of received messages. Epsilon(*) is actually an error tolerance number or a predefined fault tolerance level. If it is 0, it indicates zero tolerance on message loss.

Referring to FIG. 1, distributed data pipeline 100 includes a source component 110 and a number of first-level intermediate components 120 that are coupled to the source component 110 by way of a number of message transmission channels 122A and a number of notification transmission channels 122B. In the FIG. 1 example, the number of first-level intermediate components 120 is illustrated with two first-level intermediate components 120A and 120B that are each coupled to the source component 110 by way of a message transmission channel 122A and a notification transmission channel 122B.

Distributed data pipeline 100 also includes a number of second-level intermediate components 130 that are coupled to the first-level intermediate components 120 by way of a number of message transmission channels 132A and a number of notification transmission channels 132B. In the FIG. 1 example, the number of second-level intermediate components 130 is illustrated with a single second-level intermediate component 130 that is coupled to each of the first-level intermediate components 120A and 120B by way of a message transmission channel 132A and a notification transmission channel 132B.

Distributed data pipeline 100 further includes a number of sink components 140 that are coupled to the number of second-level intermediate components 130 by way of a number of message transmission channels 142A and a number of notification transmission channels 142B. In the FIG. 1 example, the number of sink components 140 is illustrated with two sink components 140A and 140B that are each coupled to the second-level intermediate component 130 by way of a message transmission channel 142A and a notification transmission channel 142B.

As shown in FIG. 1, each of the components includes a processor 150 and a memory 152 that is coupled to the processor 150. The processor 150 reads information from and writes information to the memory 152 to operate the component. In some cases, an intermediate component may be implemented in logic and not require a standalone processor and memory. In addition, although two levels of intermediate components have been illustrated, any number of levels of intermediate components can alternately be used.

As further shown in FIG. 1, the first-level intermediate components 120 and the second-level intermediate component 130 of distributed data pipeline 100 can be sorted as a directed acyclic graph (DAG) based on the data flow from source(s) to sink(s). A directed acyclic graph (DAG) is a graph that illustrates a sequence of tasks where there is no possible way for the sequence to complete a task and then somehow loop back again to the same task.

Figure 2:
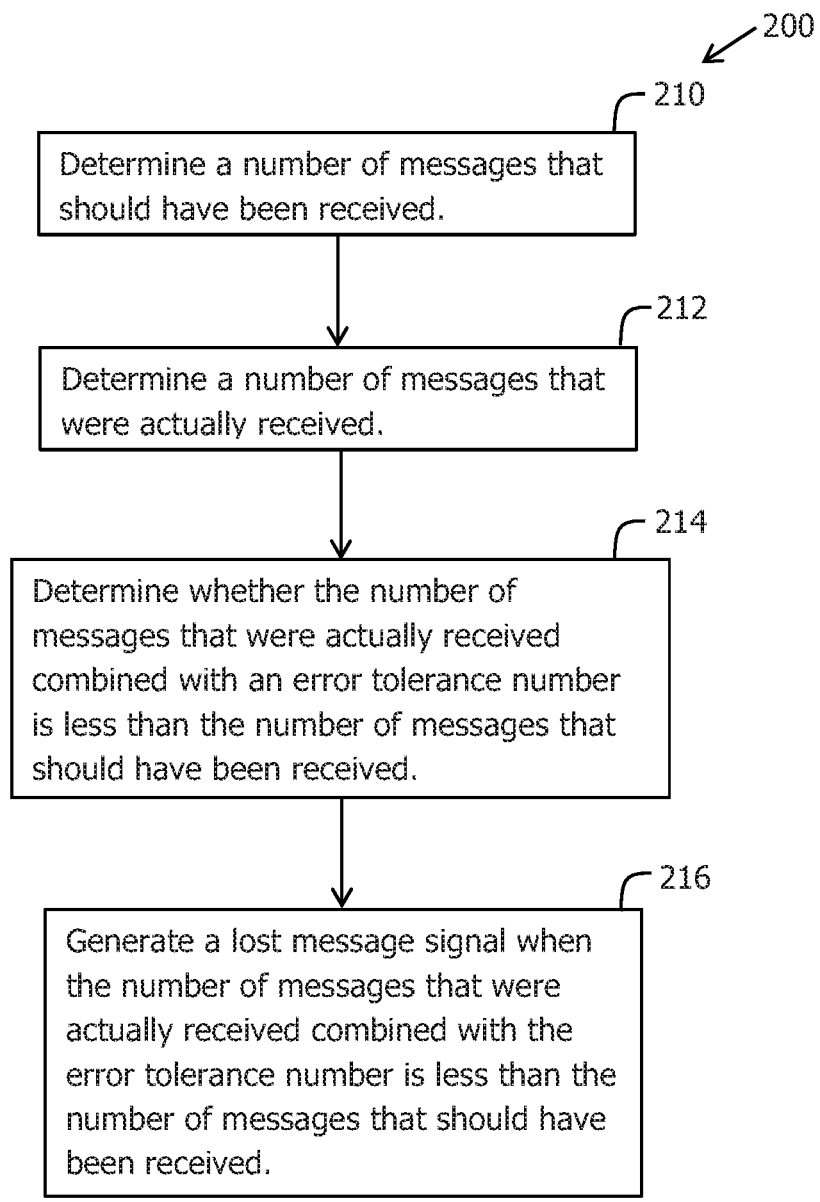
FIG. 2 is a flow chart illustrating an example of a method 200 of operating a component of a distributed data pipeline in accordance with the present invention.

FIG. 2 shows a flow chart that illustrates a first example of a method 200 of operating a component of a distributed data pipeline in accordance with the present invention. As shown in the FIG. 2 example, method 200 begins at 210 by determining a number of messages that should have been received. The number of messages that should have been received is generated by an upstream component using a predefined transformation function. After this, method 200 moves to 212 to determine a number of messages that were actually received.

Next, method 200 moves to 214 to determine whether the number of messages that were actually received combined with an error tolerance number is less than the number of messages that should have been received. The error tolerance number is the predefined fault tolerance threshold or level. For example, if the error tolerance number is 0, it indicates zero tolerance on message loss. In other words, the number of messages that should have been received and the number of messages that were actually received must match. One lost message causes the combined number to be less than the number of messages that should have been received. If the error tolerance number is 1, one lost message does not cause the combined number to be less than the number of messages that should have been received.

Following this, method 200 moves to 216 to generate a lost message signal when the number of messages that were actually received combined with the error tolerance number is less than the number of messages that should have been received. When the error tolerance number is 0, the lost message signal is generated when the number of messages that should have been received and the number of messages that were actually received do not match.

Figure 3:
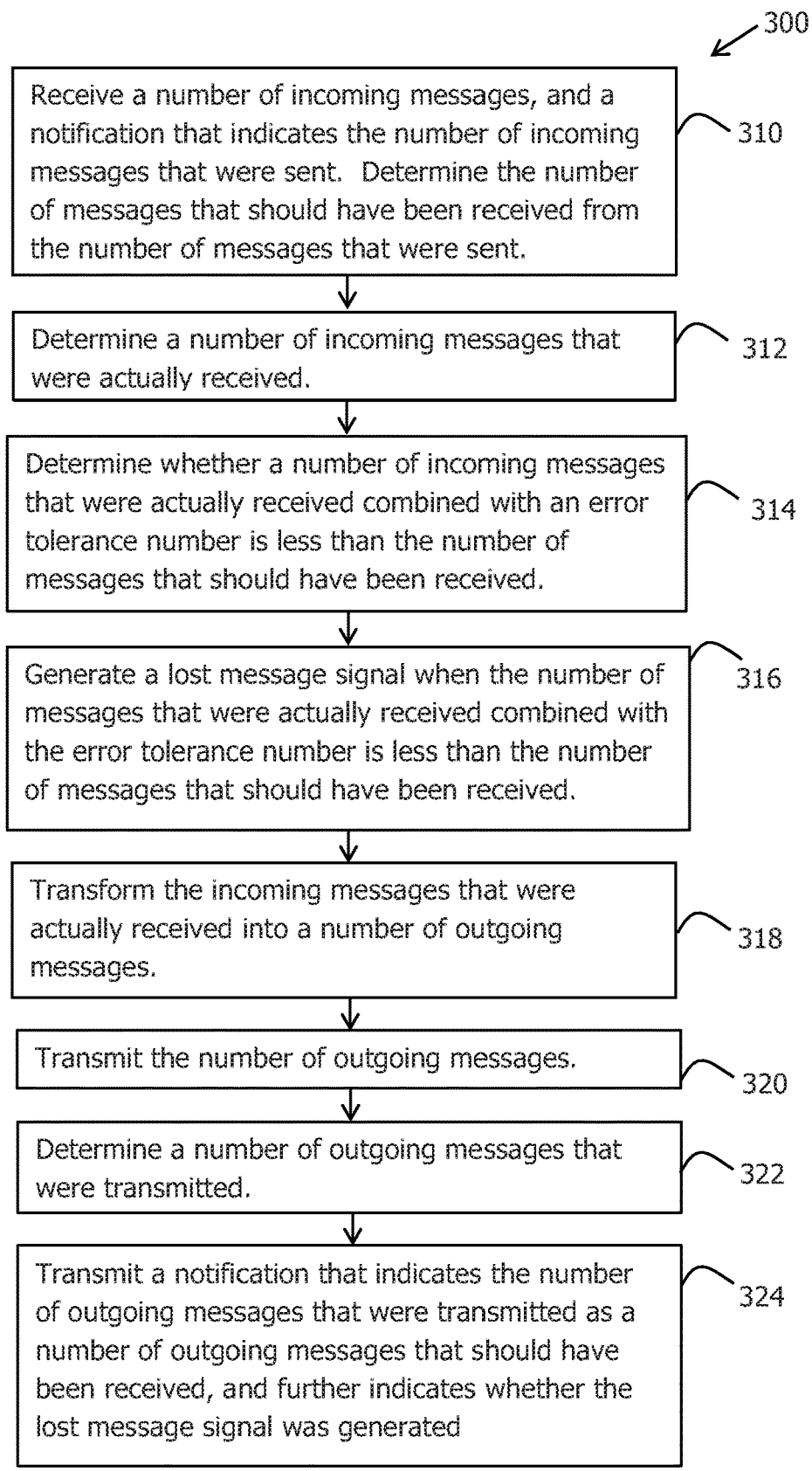
FIG. 3 is a flow chart illustrating an example of a method 300 of operating an intermediate component of a distributed data pipeline in accordance with the present invention.

FIG. 3 shows a flow chart that illustrates an example of a method 300 of operating an intermediate component of a distributed data pipeline in accordance with the present invention. As shown in the FIG. 3 example, method 300 begins at 310 by receiving a number of incoming messages, and a notification that indicates the number of incoming messages that were sent. The number of messages that should have been received in 210 of FIG. 2 can be determined from the number of incoming messages that were sent.

The messages can be sent via a message transmission channel, such as message transmission channel 122A, and the notification can be sent via a notification transmission channel, such as notification transmission channel 122B. Alternately, the notification with the number of incoming messages that were sent can be included in a header of an incoming message.

After this, method 300 moves to 312 to determine a number of incoming messages that were actually received. In the present example, the number of incoming messages that were actually received is determined by counting the incoming messages as the incoming messages are received. Next, method 300 moves to 314 to determine whether the number of incoming messages that were actually received combined with an error tolerance number is less than the number of incoming messages that should have been received.

Following this, method 300 moves to 316 to generate a lost message signal when the number of incoming messages that were actually received combined with the error tolerance number is less than the number of incoming messages that should have been received. Next, method 300 moves to 318 transform the incoming messages that were actually received into a number of outgoing messages. In many cases, following the transformation, the number of outgoing messages is different from the number of incoming messages that were actually received.

After the transformation, method 300 moves to 320 to transmit the number of outgoing messages, and then to 322 to determine a number of outgoing messages that were transmitted. In the present example, the number of outgoing messages that were transmitted is determined by counting the outgoing messages as the outgoing messages are transmitted.

Following this, method 300 moves to 324 to transmit an outgoing notification that indicates the number of outgoing messages that were transmitted as a number of outgoing messages that were sent, and further indicates whether the lost message signal was generated. Thus, method 300 determines whether any incoming messages were lost, and provides a count to the next component in the pipeline to determine whether any of the outgoing messages were lost and not received.

Figure 4:
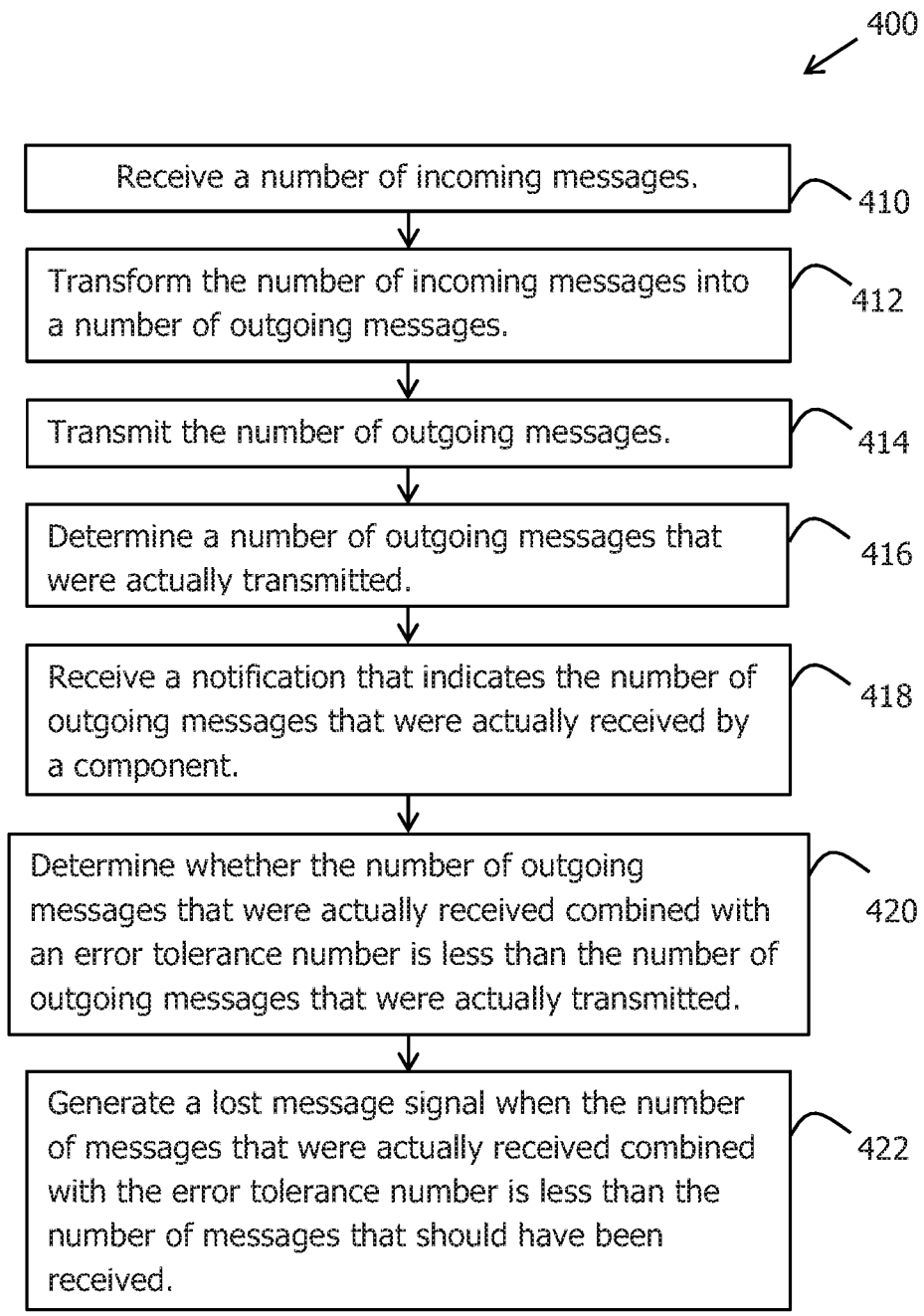
FIG. 4 is a flow chart illustrating an example of a method 400 of operating an intermediate component of a distributed data pipeline in accordance with the present invention.

FIG. 4 shows a flow chart that illustrates an example of a method 400 of operating an intermediate component of a distributed data pipeline in accordance with the present invention. As shown in the FIG. 4 example, method 400 begins at 410 by receiving a number of incoming messages. After this, method 400 moves to 412 to transform the number of incoming messages into a number of outgoing messages. In many cases, the number of incoming messages and the number of outgoing messages are different.

After the transformation, method 400 moves to 414 to transmit the number of outgoing messages, and then to 416 to determine the number of outgoing messages that were transmitted. In the present example, the number of outgoing messages that were transmitted is determined by counting the outgoing messages as the outgoing messages are transmitted.

After this, method 400 moves to 418 to receive a notification that indicates the number of outgoing messages that were actually received by a component. Next, method 400 moves to 420 to determine whether the number of outgoing messages that were actually received combined with an error tolerance number is less than the number of outgoing messages that were actually transmitted.

Following this, method 400 moves to 422 to generate a lost message signal when the number of outgoing messages that were actually received combined with an error tolerance number is less than the number of outgoing messages that were actually transmitted.

Figure 5A:
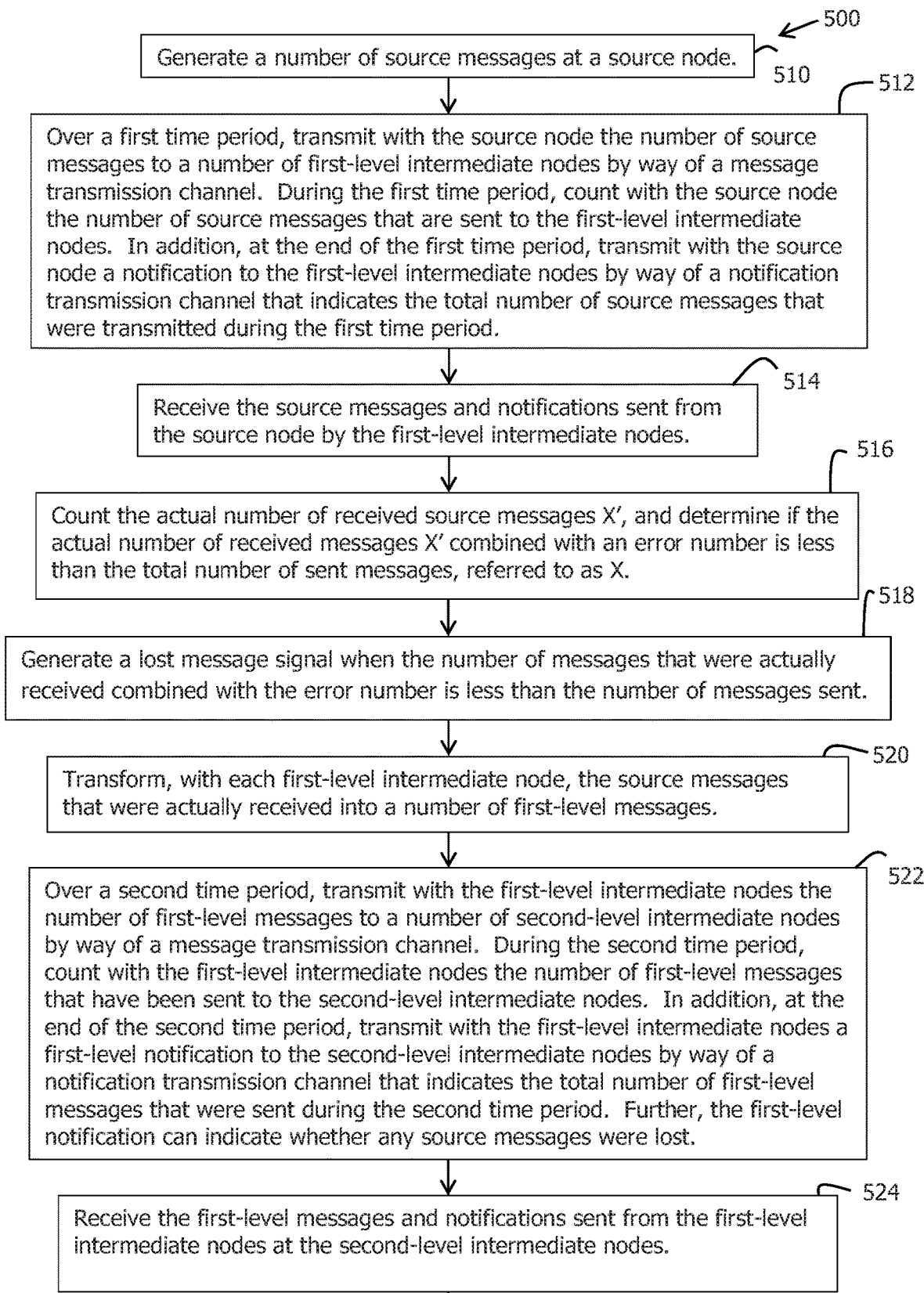
FIGS. 5A-5B are a flow chart illustrating an example of a method 500 of operating a distributed data pipeline in accordance with the present invention.
Figure 5B:
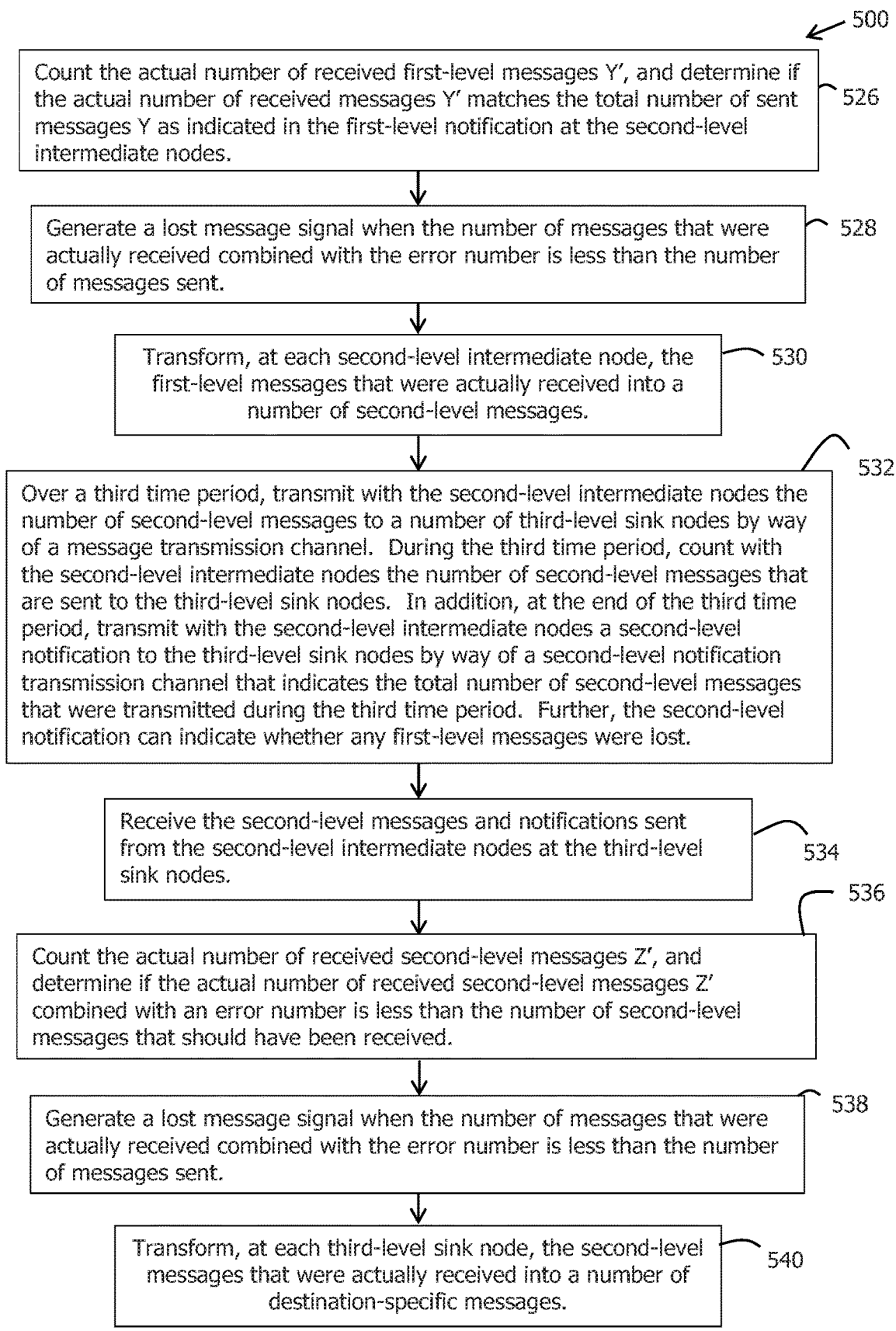

FIGS. 5A-5B show a flow chart that illustrates an example of a method 500 of operating a distributed data pipeline in accordance with the present invention. As shown in FIGS. 5A-5B, method 500 begins at 510 by generating a number of source messages at a source node, such as source component 110. The messages can be generated at a fixed or variable rate.

Method 500 next moves to 512 to transmit, over a first time period, the number of source messages to a number of first-level intermediate nodes, such as the first-level intermediate components 120A and 120B, by way of a message transmission channel. During the first time period, method 500 also counts the number of source messages that are sent to the first-level intermediate nodes.

In addition, at the end of the first time period, method 500 further transmits a source notification to the first-level intermediate nodes by way of a notification transmission channel that indicates the total number of source messages that were transmitted during the first time period. The source messages and notifications can be transmitted by the source node.

With respect to FIG. 1, the source component 110 transmits the source messages to the first-level intermediate components 120A and 120B by way of the message transmission channels 122A over a first time period, counts the number of source messages that have been sent to the first-level intermediate components 120A and 120B during the first time period, and transmits a source notification to the first-level intermediate components 120A and 120B by way of the notification transmission channels 122B that indicates the total number of messages that have been sent.

Method 500 next moves to 514 to receive the source messages and notifications sent from the source node at the first-level intermediate nodes. With respect to FIG. 1, the first-level intermediate components 120A and 120B receive the messages from the source component 110 by way of the message transmission channels 122A, and the notification from the source component 110 indicating the total number of source messages that have been sent by way of the notification transmission channels 122B.

Following this, method 500 moves to 516 to count the actual number of received source messages, referred to as X', and then determine whether the actual number of received source messages X' combined with an error tolerance number is less than the total number of sent messages, referred to as X, as indicated in the source notification. The counting and determining can be performed with the first-level intermediate nodes. If X', or alternately X'+Epsilon(*) (the error tolerance number), is less than X, the first-level intermediate nodes detect a message loss event.

With respect to FIG. 1, the first intermediate components 120A and 120B count the number of source messages that have been received by way of the message transmission channels 122A, and determine whether the number of source messages that have been received by way of the message transmission channels 122A combined with an error tolerance number is less than the total number of source messages that were sent as indicated by the source notification received by way of the notification transmission channels 122B.

Following this, method 500 moves to 518 to generate a lost message signal when the number of source messages that were actually received combined with the error tolerance number is less than the number of source messages that were sent and should have been received. Next, method 500 moves to 520 where each first-level intermediate node transforms the source messages that were actually received into a number of first-level messages by passing, modifying, reassembling, or even dropping the received source messages, depending on the transformation function of the first-level intermediate node. In many cases, the number of source messages that were actually received and the number of first-level messages are different.

For example, one first-level intermediate node may transform a single source message into a five first-level messages using a transformation function represented as f(*), while another first-level intermediate node may transform a single source message into ten first-level messages using a transformation function represented as g(*).

With respect to FIG. 1, each of the first-level intermediate components 120A and 120B transforms the source messages that were actually received into a number of first-level messages by passing the received source messages, modifying the received source messages, or generating new source messages based on the received source messages, depending on the transformation function of the intermediate component.

Method 500 next moves to 522 where, over a second time period, method 500 transmits the number of first-level messages to a number of second-level intermediate nodes, such as the second-level intermediate component 130, by way of a message transmission channel. During the second time period, method 500 also counts the number of first-level messages that have been sent to the second-level intermediate nodes.

In addition, at the end of the second time period, method 500 transmits a first-level notification to the second-level intermediate nodes by way of a notification transmission channel that indicates the total number of first-level messages that were transmitted during the second time period. Further, the first-level notification can indicate whether any message lost events have occurred. The first-level messages and notifications can be transmitted by the first-level intermediate nodes.

With respect to FIG. 1, the first-level intermediate components 120A and 120B transmit the first-level messages to the second-level intermediate component 130 over the message transmission channels 132A, count the number of first-level messages that have been sent to the second-level intermediate component 130, and transmit a first-level notification to the second-level intermediate component 130 over the notification transmission channels 132B that indicates the total number of messages that have been sent as well as whether any message lost events occurred.

Method 500 next moves to 524 to receive the first-level messages and notifications sent from the first-level intermediate nodes at the second-level intermediate nodes. With respect to FIG. 1, the second-level intermediate component 130 receives the first-level messages from the first-level intermediate components 120A and 120B by way of the message transmission channels 132A, and the first-level notifications from the first-level intermediate components 120A and 120B indicating the total number of first-level messages that have been sent by way of the notification transmission channel 132B.

Following this, method 500 moves to 526 to count the actual number of received first-level messages, referred to as Y', and then determine whether the actual number of received first-level messages Y' combined with an error tolerance number is less than the total number of sent messages, referred to as Y, as indicated in the first-level notifications. The counting and determining can be performed with the second-level intermediate nodes. If Y', or alternately Y'+Epsilon(*) (the error tolerance number), is less than Y, the second-level intermediate nodes detect a message loss event.

With respect to FIG. 1, the second intermediate component 130 determines the number of first-level messages that have been received from the first-level intermediate node 120A by way of the message transmission channel 132A, and determines whether the number of first-level messages that have been received from the first-level intermediate node 120A by way of the message transmission channel 132A combined with an error tolerance number is less than the total number of first-level messages that were sent as indicated by the first-level notification received from the first-level intermediate node 120A by way of the notification transmission channel 132B.

In addition, the second intermediate component 130 separately determines the number of first-level messages that have been received from the first-level intermediate node 120B by way of the message transmission channel 132A, and determines whether the number of first-level messages that have been received from the first-level intermediate node 120B by way of the message transmission channel 132A combined with an error tolerance number is less than the total number of first-level messages that were sent as indicated by the first-level notification received from the first-level intermediate node 120B by way of the notification transmission channel 132B.

Next, method 500 moves to 528 to generate a lost message signal when the number of first-level messages that were actually received combined with the error tolerance number is less than the number of first-level messages that were sent and should have been received. Following this, method 500 moves to 530 where each second-level intermediate node transforms the first-level messages that were actually received into a number of second-level messages by passing, modifying, reassembling, or even dropping the received first-level messages, depending on the transformation function of the node. In many cases, the number of first-level messages that were actually received and the number of second-level messages are different.

For example, a second-level intermediate node may transform five first-level messages from one first-level intermediate node into ten second-level messages using a transformation function represented as f(**), and may transform 10 first-level messages from one first-level intermediate node into 20 second-level messages using a transformation function represented as g(**). The transformation function can be a vector of functions when, as in the present example, messages are sent to multiple components.

With respect to FIG. 1, the second-level intermediate component 130 transforms the first-level messages into second-level messages by passing the received first-level messages, modifying the received first-level messages, merging the received first-level messages, or generating new second-level messages based on the received first-level messages, depending on the transformation function of the intermediate component.

Method 500 next moves to 532 where, over a third time period, method 500 transmits the number of second-level messages to a number of third-level sink nodes, such as the third-level sink components 140A and 140B, by way of a message transmission channel. During the third time period, method 500 also counts the number of second-level messages that have been sent to the third-level sink nodes.

In addition, at the end of the third time period, method 500 transmits a second-level notification to the third-level sink nodes by way of a notification transmission channel that indicates the total number of second-level messages that were transmitted during the third time period. Further, the second-level notification can indicate whether any first-level messages were lost. The second-level messages and notifications can be transmitted by the second-level nodes. With respect to FIG. 1, second-level intermediate component 130 transmits the second-level messages to the third-level sink components 140A and 140B by way of the message transmission channels 142A over the third time period, and the second-level notification by way of the notification transmission channels 142B.

Method 500 next moves to 534 to receive the second-level messages and notifications sent from the second-level intermediate node at the third-level sink nodes, which do not forward or send messages to other components. With respect to FIG. 1, the third-level sink components 140A and 140B receive the second-level messages from the second-level intermediate component 130 by way of the message transmission channels 142A, and the second-level notifications from second-level intermediate component 130 indicating the total number of second-level messages that have been sent by way of the notification transmission channels 142B.

Following this, method 500 moves to 536 to count the actual number of received second-level messages, referred to as Z', and then determine whether the actual number of received second-level messages Z' combined with an error tolerance number is less than the total number of second-level messages, referred to as Z, that were sent as indicated by the second-level notification. The counting and determining can be performed with the third-level sink nodes. If Z' (or alternately Z'+Epsilon(*)) is less than Z, the third-level sink nodes detect a message loss event.

Next, method 500 moves to 538 to generate a lost message signal when the number of second-level messages that were actually received combined with the error tolerance number is less than the number of second-level messages that were sent and should have been received. Following this, method 500 moves to 540 where each third-level sink node transforms the second-level messages that were actually received into a number of destination-specific messages by passing, modifying, reassembling, or even dropping the received second-level messages, depending on the transformation function of the node. In many cases, the number of second-level messages that were actually received and the number of destination-specific messages are different.

Thus, the third-level sink nodes and sink components 140A and 140B receive the messages sent by the source node and source component 110, and additionally receive and determine whether any of the messages have been lost as the messages moved through the distributed data pipeline. As a result, if any data is missing in the pipeline, the present invention can precisely locate where the data was lost.

Further, the present approach applies for both batch mode and streaming mode. The fixed period T can be substituted by a sliding window or a water mark in streaming mode. The expected number of messages can also be packed into the header of a message which reuses the data path instead of using separated notification channel. Alternately, a receiving node can notify its immediate upper level sender as to how many messages have been successfully received, where the sender compares the number with the number of messages actually sent.

In summary, a transformation function is defined at each node or network component. In addition, each node or network component compares the number of actually received messages with the expected number from one or more parent nodes to detect a message loss event and locate where the message loss event occurred. Through this approach of detecting lost messages at each step in the pipeline, the data quality from the source(s) to sink(s) in a distributed data pipeline can be assured.

All nodes are loosely synchronized and a small number Epsilon(*) can be added when comparing the actually received number of messages and the expected number. The transformation function can be explicitly defined based on concrete business logic or implicitly implied by counting the number of successfully sent messages. The components of the data pipeline can be either open-source or close-source software.

In the whole pipeline, the number of messages generated by a source is audited at each component of the pipeline. Using the above described audit method, a loss event can be efficiently detected and located. In the audit method above, the transformation functions are predefined to determine the number of messages expected to be received at the next level of component. The predefined function can cover one-to-one, one-to-many and many-to-many transmission relationships. In addition, the message loss event(s) are detected and the component(s) that causes the loss is located by comparing actually received number of messages and the expected number of messages at each component of a distributed data pipeline.

The technical solutions in the embodiments of the present application have been clearly and completely described in the prior sections with reference to the drawings of the embodiments of the present application. It should be noted that the terms "first", "second", and the like in the description and claims of the present invention and in the above drawings are used to distinguish similar objects and are not necessarily used to describe a specific sequence or order. It should be understood that these numbers may be interchanged where appropriate so that the embodiments of the present invention described herein can be implemented in orders other than those illustrated or described herein.

The functions described in the method of the present embodiment, if implemented in the form of a software functional unit and sold or used as a standalone product, can be stored in a computing device readable storage medium. Based on such understanding, a portion of the embodiments of the present application that contributes to the prior art or a portion of the technical solution may be embodied in the form of a software product stored in a storage medium, including a plurality of instructions for causing a computing device (which may be a personal computer, a server, a mobile computing device, or a network device, and so on) to perform all or part of the steps of the methods described in various embodiments of the present application. The foregoing storage medium includes: a USB drive, a portable hard disk, a read-only memory (ROM), a random access memory (RAM), a magnetic disk, an optical disk, and the like, which can store program code.

The various embodiments in the specification of the present application are described in a progressive manner, and each embodiment focuses on its difference from other embodiments, and the same or similar parts between the various embodiments may be referred to another case. The described embodiments are only a part of the embodiments, rather than all of the embodiments of the present application. All other embodiments obtained by a person of ordinary skill in the art based on the embodiments of the present application without departing from the inventive skills are within the scope of the present application.

The above description of the disclosed embodiments enables a person skilled in the art to make or use the present application. Various modifications to these embodiments are obvious to a person skilled in the art, and the general principles defined herein may be implemented in other embodiments without departing from the spirit or scope of the present application. Therefore, the present application is not limited to the embodiments shown herein, but the broadest scope consistent with the principles and novel features disclosed herein.

What is claimed is:

1. A component of a distributed data pipeline, the component comprising:
    a memory; and
    a processor coupled to the memory, the processor configured to read information from and write information to the memory to:
        determine a number of messages that should have been received based on a number of sent messages indicated in an incoming notification received from an upstream component during a first time period;
        determine a number of incoming messages that were actually received;
        determine whether the number of incoming messages that were actually received combined with an error tolerance number is less than the number of messages that should have been received;
        generate a lost message signal when the number of incoming messages that were actually received combined with the error tolerance number is less than the number of messages that should have been received;
        transform, upon the generation of the lost message signal, the number of incoming messages that were actually received into a number of outgoing messages based on a transformation function of the component, wherein the transformation function is predefined at the component to determine the number of messages expected to be received at a next level of the component; and
        transmit an outgoing notification that indicates at least the number of outgoing messages that were transmitted as a number of outgoing messages that were sent.

2. The component of claim 1, wherein the processor is further configured to:
    receive a number of incoming messages and the incoming notification that indicates the number of incoming messages that were sent, wherein the number of incoming messages and the number of outgoing messages are different.

3. The component of claim 2, wherein the processor is further configured to:
    transmit the number of outgoing messages; and
    determine a number of outgoing messages that were transmitted, wherein the outgoing notification further indicates whether the lost message signal was generated.

4. The component of claim 3, wherein:
    the number of incoming messages that were actually received is determined by counting the incoming messages as the incoming messages are received, and
    the number of outgoing messages that were transmitted is determined by counting the outgoing messages as the outgoing messages are transmitted.

5. The component of claim 3, wherein the number of incoming messages is included in a header of an incoming message.

6. The component of claim 1, wherein the processor is further configured to:
    receive a number of incoming messages;
    transmit the number of outgoing messages;
    determine a number of outgoing messages that were transmitted;
    determine the number of messages that should have been received from the number of outgoing messages; and
    receive a notification that indicates the number of outgoing messages that were actually received.

7. A method of operating a component of a distributed data pipeline, the method comprising:
    determining, by a processor, a number of messages that should have been received based on a number of sent messages indicated in an incoming notification received from an upstream component during a first time period;
    determining, by the processor, a number of incoming messages that were actually received;
    determining, by the processor, whether the number of incoming messages that were actually received combined with an error tolerance number is less than the number of messages that should have been received;
    generating, by the processor, a lost message signal when the number of incoming messages that were actually received combined with the error tolerance number is less than the number of messages that should have been received;
    transforming, by the processor upon the generation of the lost message signal, the number of incoming messages that were actually received into a number of outgoing messages based on a transformation function of the component, wherein the transformation function is predefined at the component to determine the number of messages expected to be received at a next level of the component; and
    transmitting, by the processor, an outgoing notification that indicates at least the number of outgoing messages that were transmitted as a number of outgoing messages that were sent.

8. The method of claim 7, further comprising:
    receiving, by the processor, a number of incoming messages and the incoming notification that indicates the number of incoming messages that were sent, wherein the number of incoming messages and the number of outgoing messages are different.

9. The method of claim 8, further comprising:
transmitting, by the processor, the number of outgoing messages; and
determining, by the processor, a number of outgoing messages that were transmitted, wherein the outgoing notification further indicates whether the lost message signal was generated.

10. The method of claim 9, wherein:
the number of incoming messages that were actually received is determined by counting the incoming messages as the incoming messages are received, and
the number of outgoing messages that were transmitted is determined by counting the outgoing messages as the outgoing messages are transmitted.

11. The method of claim 9, wherein the number of incoming messages is included in a header of an incoming message.

12. The method of claim 7, further comprising:
receiving, by the processor, a number of incoming messages;
transmitting, by the processor, the number of outgoing messages;
determining, by the processor, a number of outgoing messages that were transmitted, and the number of outgoing messages determining the number of messages that should have been received; and
receiving, by the processor, a notification that indicates the number of outgoing messages that were actually received.

13. A non-transitory computer-readable storage medium, having embedded therein program instructions, which when executed by a processor cause the processor to execute a method of operating a component in a distributed data pipeline, the method comprising:
determining a number of messages that should have been received based on a number of sent messages indicated in an incoming notification received from an upstream component during a first time period;
determining a number of incoming messages that were actually received;
determining whether the number of incoming messages that were actually received combined with an error tolerance number is less than the number of messages that should have been received;
generating a lost message signal when the number of messages that were actually received combined with the error tolerance number is less than the number of messages that should have been received;
transforming, upon the generation of the lost message signal, the number of incoming messages that were actually received into a number of outgoing messages based on a transformation function of the component, wherein the transformation function is predefined at the component to determine the number of messages expected to be received at a next level of the component; and
transmitting an outgoing notification that indicates at least the number of outgoing messages that were transmitted as a number of outgoing messages that were sent.

14. The medium of claim 13, wherein the method further comprises:
receiving a number of incoming messages and the incoming notification that indicates the number of incoming messages that were sent, wherein the number of incoming messages and the number of outgoing messages are different.

15. The medium of claim 14, wherein the method further comprises:
transmitting the number of outgoing messages; and
determining a number of outgoing messages that were transmitted, wherein the outgoing notification further indicates whether the lost message signal was generated.

16. The medium of claim 15, wherein:
the number of incoming messages that were actually received is determined by counting the incoming messages as the incoming messages are received, and
the number of outgoing messages that were transmitted is determined by counting the outgoing messages as the outgoing messages are transmitted.

17. The medium of claim 15, wherein the number of incoming messages is included in a header of an incoming message.

18. The medium of claim 13, wherein the method further comprises:
receiving a number of incoming messages, wherein the number of incoming messages and the number of outgoing messages are different;
transmitting the number of outgoing messages;
determining a number of outgoing messages that were transmitted, the number of outgoing messages determining the number of messages that should have been received; and
receiving a notification that indicates the number of outgoing messages that were actually received.

19. A distributed data pipeline, comprising:
a source component configured to:
generate a number of messages;
transmit the number of messages;
determine a number of messages that were transmitted;
transmit a notification that indicates a number of messages that should have been received from the number of messages that were transmitted; and
a first-level component coupled to the source component, the first level component configured to:
receive the number of messages;
determine a number of messages that should have been received from the notification;
determine a number of incoming messages that were actually received;
determine whether the number of incoming messages that were actually received combined with an error tolerance number is less than the number of messages that should have been received;
generate a lost message signal when the number of incoming messages that were actually received combined with the error tolerance number is less than the number of messages that should have been received; and
transform, upon the generation of the lost message signal, the incoming messages that were actually received into a number of outgoing messages based on a transformation function of the first-level component, wherein the transformation function is predefined at the first-level component to determine the number of messages expected to be received at a next level of the first-level component, wherein the number of incoming messages that were actually received and the number of outgoing messages are different.

20. The distributed data pipeline of claim 19, wherein the first-level component is further configured to:
  transmit the number of outgoing messages;
  determine a number of outgoing messages that were transmitted; and
  transmit an outgoing notification that indicates the number of outgoing messages that were transmitted as a number of outgoing messages that were sent, and further indicates whether the lost message signal was generated.

* * * * *